United States Patent
Ushio et al.

(10) Patent No.: US 8,003,278 B2
(45) Date of Patent: Aug. 23, 2011

(54) FUEL CELL

(75) Inventors: Takeshi Ushio, Utsunomiya (JP);
Chikara Iwasawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1027 days.

(21) Appl. No.: 11/712,714

(22) Filed: Mar. 1, 2007

(65) Prior Publication Data
US 2007/0207371 A1  Sep. 6, 2007

(30) Foreign Application Priority Data
Mar. 3, 2006  (JP) ................................. 2006-058104

(51) Int. Cl.
*H01M 8/02* (2006.01)
*H01M 8/10* (2006.01)
*H01M 4/94* (2006.01)
(52) U.S. Cl. .......................... 429/514; 429/479; 429/529
(58) Field of Classification Search .................... 429/38, 429/514
See application file for complete search history.

(56) References Cited

U.S. PATENT DOCUMENTS

| | | | | |
|---|---|---|---|---|
| 6,083,101 A * | 7/2000 | Kaga et al. | | 454/309 |
| 7,226,688 B2 * | 6/2007 | Fujii et al. | | 429/38 |
| 7,618,735 B2 * | 11/2009 | Sugiura et al. | | 429/38 |
| 2004/0106028 A1 * | 6/2004 | Sugiura et al. | | 429/26 |
| 2005/0186459 A1 * | 8/2005 | Sugiura et al. | | 429/26 |
| 2006/0008695 A1 * | 1/2006 | Bai et al. | | 429/38 |

FOREIGN PATENT DOCUMENTS

| | | |
|---|---|---|
| JP | 8-180883 | 7/1996 |
| JP | 2002-025584 | 1/2002 |

* cited by examiner

*Primary Examiner* — Patrick Ryan
*Assistant Examiner* — Brent Thomas
(74) *Attorney, Agent, or Firm* — Nelson Mullins Riley & Scarborough LLP; Anthony A. Laurentano, Esq.; EuiHoon Lee, Esq.

(57) ABSTRACT

A power generation cell includes a membrane electrode assembly, and first and second separators sandwiching the membrane electrode assembly. The first separator includes an oxygen-containing gas flow field. An inlet buffer area is provided between the oxygen-containing gas flow field and an oxygen-containing gas supply passage, and an outlet buffer area is provided between the oxygen-containing gas flow field and an oxygen-containing gas discharge passage. Plural columnar resistance members are provided within the inlet buffer area and the outlet buffer area. The membrane electrode assembly further includes first and second humidification sections.

8 Claims, 11 Drawing Sheets

← WATER VAPOR
◄---- OXYGEN-CONTAINING GAS

← WATER VAPOR
◄---- OXYGEN-CONTAINING GAS

FIG. 11

FUEL CELL

BACKGROUND OF THE INVENTION

1. Field of the Invention

The present invention relates to a fuel cell formed by stacking a membrane electrode assembly and a separator in a stacking direction. The membrane electrode assembly includes a pair of electrodes and an electrolyte membrane interposed between the electrodes. A reactant gas passage acting as a passage for a reactant gas extends through the separator in the stacking direction.

2. Description of the Related Art

A polymer electrolyte fuel cell employs a membrane electrode assembly (MEA), which includes an anode, a cathode, and an electrolyte membrane interposed between the anode and the cathode. The electrolyte membrane is a solid polymer ion exchange membrane. The membrane electrode assembly and separators sandwiching the membrane electrode assembly make up a unit of a power generation cell for generating electricity. Normally, a predetermined number of power generation cells are stacked together, wherein terminal plates, insulating plates, and end plates are disposed at opposite ends thereof to form a fuel cell stack.

In the fuel cell, in order to ensure that power is generated effectively, a desired humidified state of the electrolyte membrane needs to be maintained. For this purpose, for example, an external humidification method is known. In this method, a humidification apparatus for humidifying both the fuel gas and an oxygen-containing gas using water is provided. The humidification apparatus is connected to the fuel cell for supplying the humidified fuel and oxygen-containing gases to the fuel cell.

Figure 11:
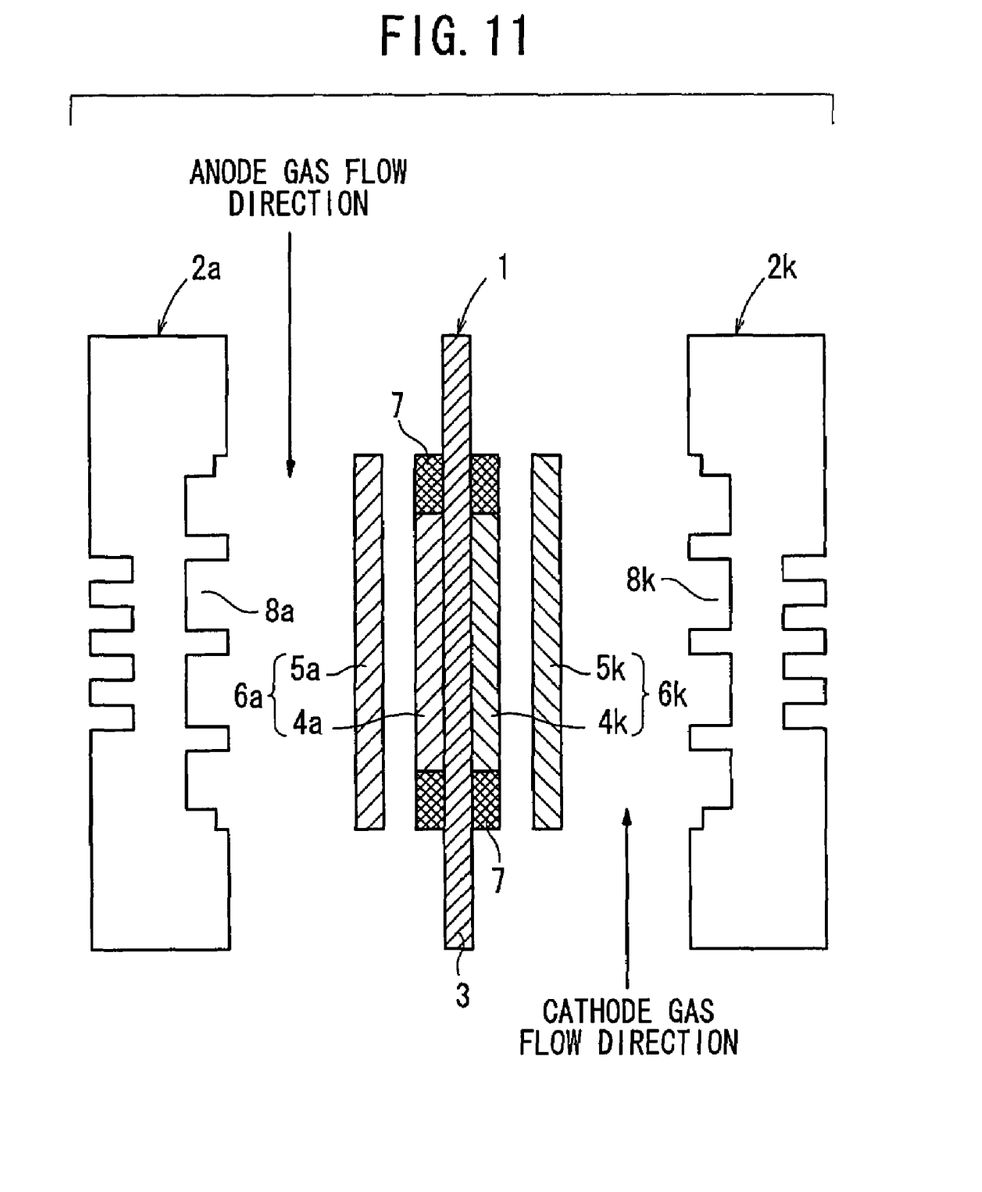
FIG. 11 is a view showing a conventional fuel cell.

An internal humidification method is also known. In this method, a humidification unit and a fuel cell are formed integrally. For example, Japanese Laid-Open Patent Publication No. 2002-25584 discloses a polymer electrolyte fuel cell as shown in FIG. 11. The fuel cell comprises a membrane electrode assembly 1, an anode side separator 2a, and a cathode side separator 2k.

The membrane electrode assembly 1 includes an anode 6a and a cathode 6k formed by joining catalyst layers 4a, 4k and diffusion layers 5a, 5k on both surfaces of an electrolyte membrane 3. The membrane electrode assembly 1 includes humidification sections 7 disposed in areas of the electrolyte membrane where the catalyst layers 4a, 4k are not present. Anode gas flow grooves 8a and cathode gas flow grooves 8k, having serpentine patterns for example, are formed in the anode side separator 2a and the cathode side separator 2k, respectively.

The anode gas and the cathode gas flow respectively in a counterflowing manner. Therefore, after the cathode gas has been humidified by water produced in a reaction within the catalyst layer 4k, the water moves from the cathode 6k to the anode 6a via the humidification section 7 on the upper side, due to a concentration gradient of the water vapor. The anode gas is humidified by water moving from the humidification section 7. In the humidification section 7 on the lower side, similarly, water moves from the anode 6a to the cathode 6b due to a concentration gradient of the water vapor. Thus, the cathode gas is humidified before the cathode gas is consumed in the reaction.

In the conventional technique, water vapor is exchanged between the anode gas flowing through the anode gas flow grooves 8a and the cathode gas flowing through the cathode gas flow grooves 8k. Therefore, the electrode surface area that is used for power generation is reduced by the presence of the humidification sections 7, which are provided on upper and lower sides of the anode gas flow grooves 8a and the cathode gas flow grooves 8k. Thus, the output of the fuel cell is lowered, and the overall size of the fuel cell must be made considerably large in order to achieve a sufficient electrode surface area.

Further, since a relatively stable gas flow occurs in each of the continuous anode gas flow grooves 8a and the continuous cathode gas flow grooves 8k, the flow rate of gas that flows near the surface of the humidification section 7 tends to be decreased undesirably. As a result, water vapor permeability per unit area is lowered, and the surface area of the humidification section 7 needs to be made considerably large in order to achieve a desired humidified state.

SUMMARY OF THE INVENTION

A main object of the present invention is to provide a fuel cell having a compact structure, in which it is possible to achieve a desired water vapor permeability, and wherein efficient gas humidification can be performed suitably.

The present invention relates to a fuel cell formed by stacking a membrane electrode assembly and a separator in a stacking direction. The membrane electrode assembly includes a pair of electrodes and an electrolyte membrane interposed between the electrodes. A reactant gas passage, acting as a passage for the reactant gas, extends through the separator in the stacking direction.

The separator includes a reactant gas flow field formed at a position corresponding to a power generation area of the electrode for supplying the reactant gas to the electrode, and a buffer area provided between the reactant gas flow field and the reactant gas passage for stirring the reactant gas. The membrane electrode assembly includes a humidification section facing the buffer area, wherein water permeates through the humidification section from the buffer area.

Preferably, the resistance member includes an inclined guide, which guides the reactant gas toward the membrane electrode assembly. Further, according to the present invention, a buffer area is provided between the reactant gas flow field and the reactant gas passage. Therefore, the gas flow rate of gas flowing along the outer surface of the humidification section is increased, resulting in turbulence that occurs in the reactant gas flow. As a result, by improving water vapor permeability, the surface area of the humidification section can be reduced in size, while advantageously maintaining a desired amount of water vapor permeation.

Further, since the gas flow distribution is not uniform within the buffer area, water produced during the power generation reaction can be retained easily within the buffer area. Therefore, the buffer area serves as a humidification area. Thus, the size of the power generation cell can be reduced without reducing the power generation area of the reactant gas flow field, and hence the overall size and weight of the fuel cell can be suitably reduced. Therefore, humidification can be performed advantageously and highly efficiently.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
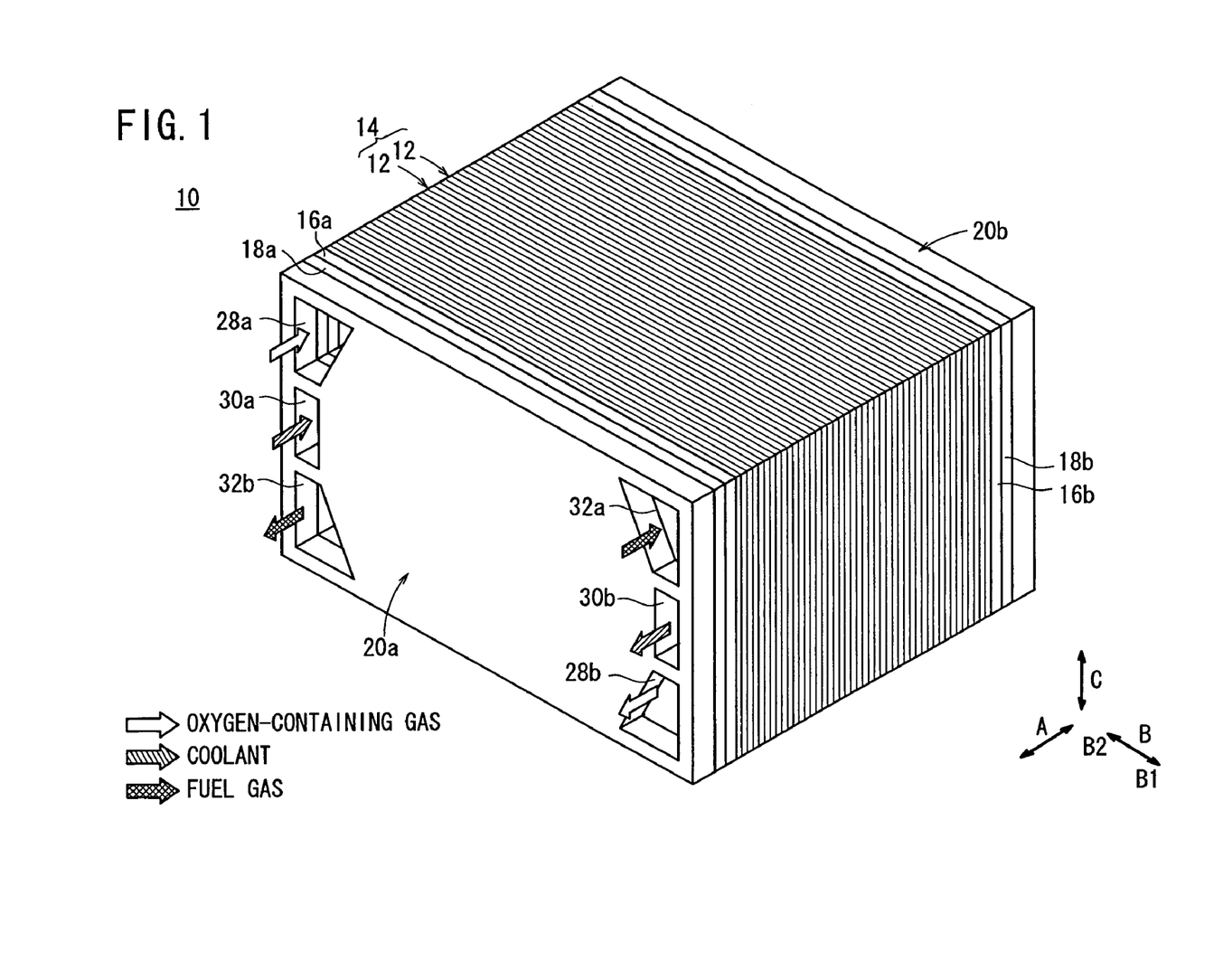
FIG. 1 is a perspective view showing a fuel cell stack according to a first embodiment of the present invention.

FIG. 1 is a perspective view showing a fuel cell stack 10 according to a first embodiment of the present invention.

The fuel cell stack 10 includes a stack body 14 formed by stacking a plurality of power generation cells 12 in a substantially horizontal direction, as indicated by the arrow A. Terminal plates 16a, 16b are provided at opposite ends of the stack body 14 in the stacking direction. Insulating plates 18a, 18b are disposed outside of the terminal plates 16a, 16b, and end plates 20a, 20b are disposed outside of the insulating plates 18a, 18b. The components disposed between the end plates 20a and 20b are tightened by means of tightening bolts (not shown) in the stacking direction. Alternatively, the stack body 14 may be arranged within a box-shaped casing (not shown). Typically, the fuel cell stack 10 is mounted in a vehicle such as an automobile, for example.

Figure 2:
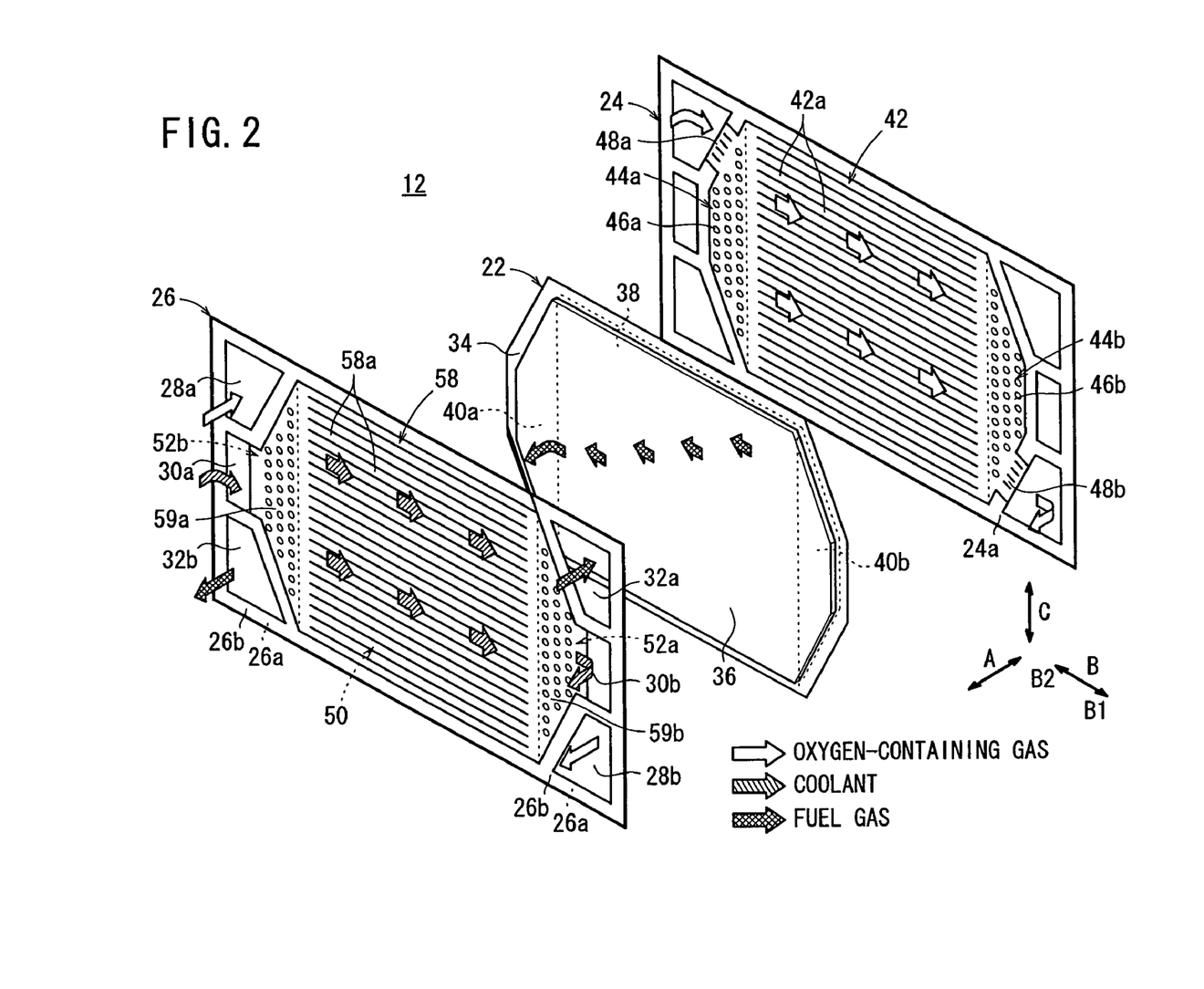
FIG. 2 is an exploded perspective view showing a power generation cell of the fuel cell stack.
Figure 3:
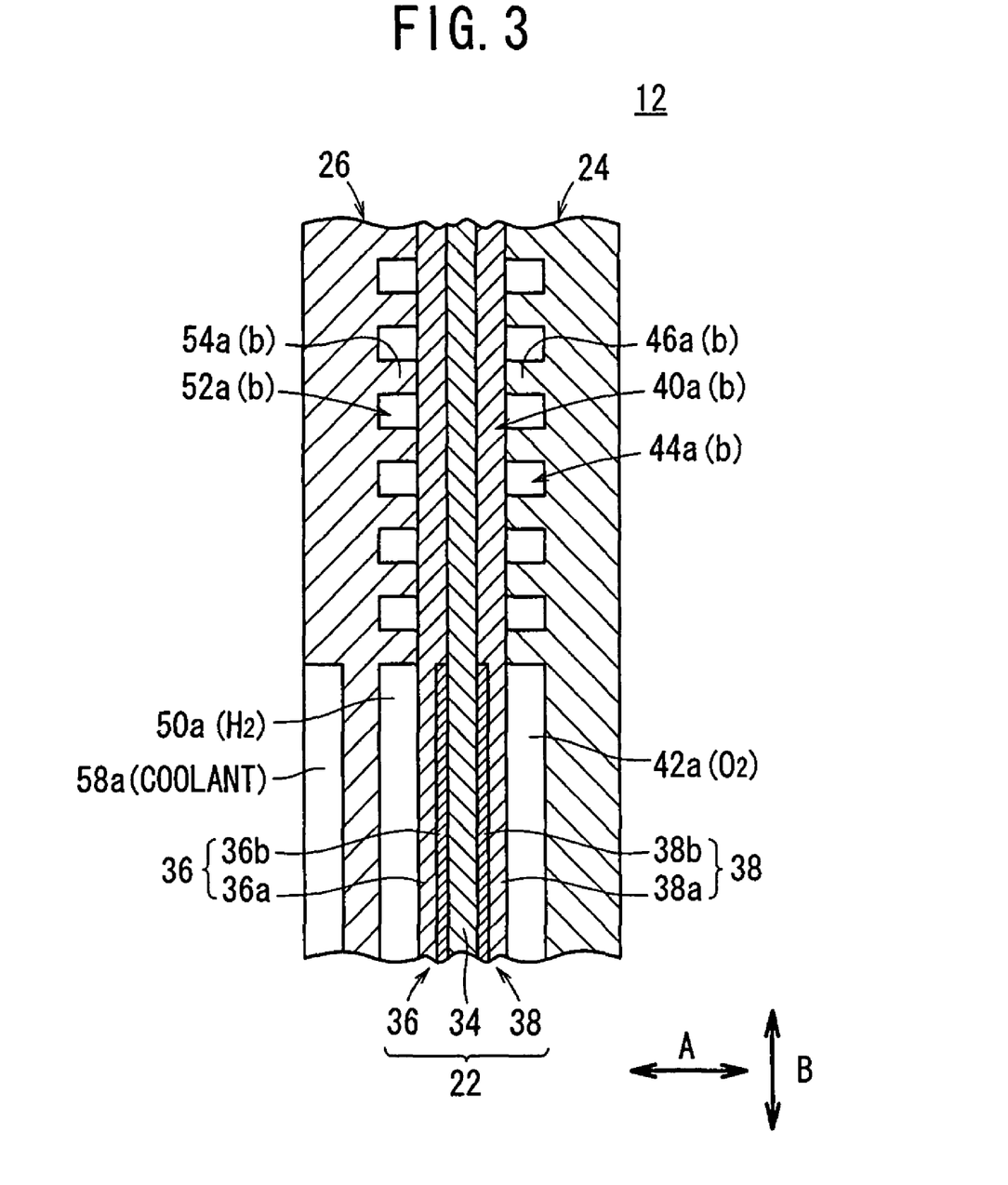
FIG. 3 is a partial enlarged cross sectional view showing the power generation cell.

As shown in FIGS. 2 and 3, each of the power generation cells 12 includes a membrane electrode assembly 22, and first and second separators 24, 26 sandwiching the membrane electrode assembly 22 therebetween. The first and second separators 24, 26 are formed, for example, from carbon plates. Alternatively, the first and second separators 24, 26 may be formed from metal plates.

As shown in FIG. 2, at one end of the power generation cell 12 in the direction indicated by the arrow B, an oxygen-containing gas supply passage 28a for supplying an oxygen-containing gas (e.g., air), a coolant supply passage 30a for supplying a coolant such as pure water or ethylene glycol, and a fuel gas discharge passage 32b for discharging a fuel such as a hydrogen-containing gas, are arranged vertically in the direction indicated by the arrow C. The oxygen-containing gas supply passage 28a, the coolant supply passage 30a, and the fuel gas discharge passage 32b extend through the power generation cell 12 in the stacking direction, as indicated by the arrow A.

At the other end of the power generation cell 12 in the direction indicated by the arrow B, a fuel gas supply passage 32a for supplying the fuel gas, a coolant discharge passage 30b for discharging the coolant, and an oxygen-containing gas discharge passage 28b for discharging the oxygen-containing gas, are arranged in the direction indicated by the arrow C. The fuel gas supply passage 32a, the coolant discharge passage 30b, and the oxygen-containing gas discharge passage 28b extend through the power generation cell 12 in the direction indicated by the arrow A.

The membrane electrode assembly 22 includes an anode 36, a cathode 38, and a solid polymer electrolyte membrane 34 interposed between the anode 36 and the cathode 38. The solid polymer electrolyte membrane 34 is formed by impregnating a thin membrane of perfluorosulfonic acid with water, for example.

As shown in FIG. 3, each of the anode 36 and the cathode 38 includes a gas diffusion layer 36a, 38a such as a carbon paper, and an electrode catalyst layer 36b, 38b made up of a platinum alloy supported on porous carbon particles. The carbon particles are deposited uniformly on the surface of the gas diffusion layer 36a, 38a. The electrode catalyst layers 36b, 38b of the anode 36 and the cathode 38 are fixed respectively to both surfaces of the solid polymer electrolyte membrane 34. The surface areas of the electrode catalyst layers 36b, 38b are smaller than the surface areas of the gas diffusion layers 36a, 38a, corresponding to buffer areas as described later. First and second humidification sections 40a, 40b also are provided, comprising only the solid polymer electrolyte membrane 34 and the gas diffusion layers 36a, 38a (see FIG. 2).

The first separator 24 has an oxygen-containing gas flow field 42 on a surface 24a thereof facing the membrane electrode assembly 22. The oxygen-containing gas flow field 42 comprises a plurality of oxygen-containing gas flow grooves 42a extending in the direction indicated by the arrow B. A substantially triangular inlet buffer area 44a is provided at one end between the oxygen-containing gas supply passage 28a and the oxygen-containing gas flow grooves 42a, and a substantially triangular outlet buffer area 44b is provided at the other end between the oxygen-containing gas discharge passage 28b and the oxygen-containing gas flow grooves 42a.

A plurality of columnar resistance members 46a, 46b are provided respectively in the inlet buffer area 44a and the outlet buffer area 44b, which act to provide resistance to the flow of oxygen-containing gas. The oxygen-containing gas supply passage 28a is connected to the inlet buffer area 44a through connection grooves 48a, whereas the oxygen-containing gas discharge passage 28b is connected to the outlet buffer area 44b through connection grooves 48b.

Figure 4:
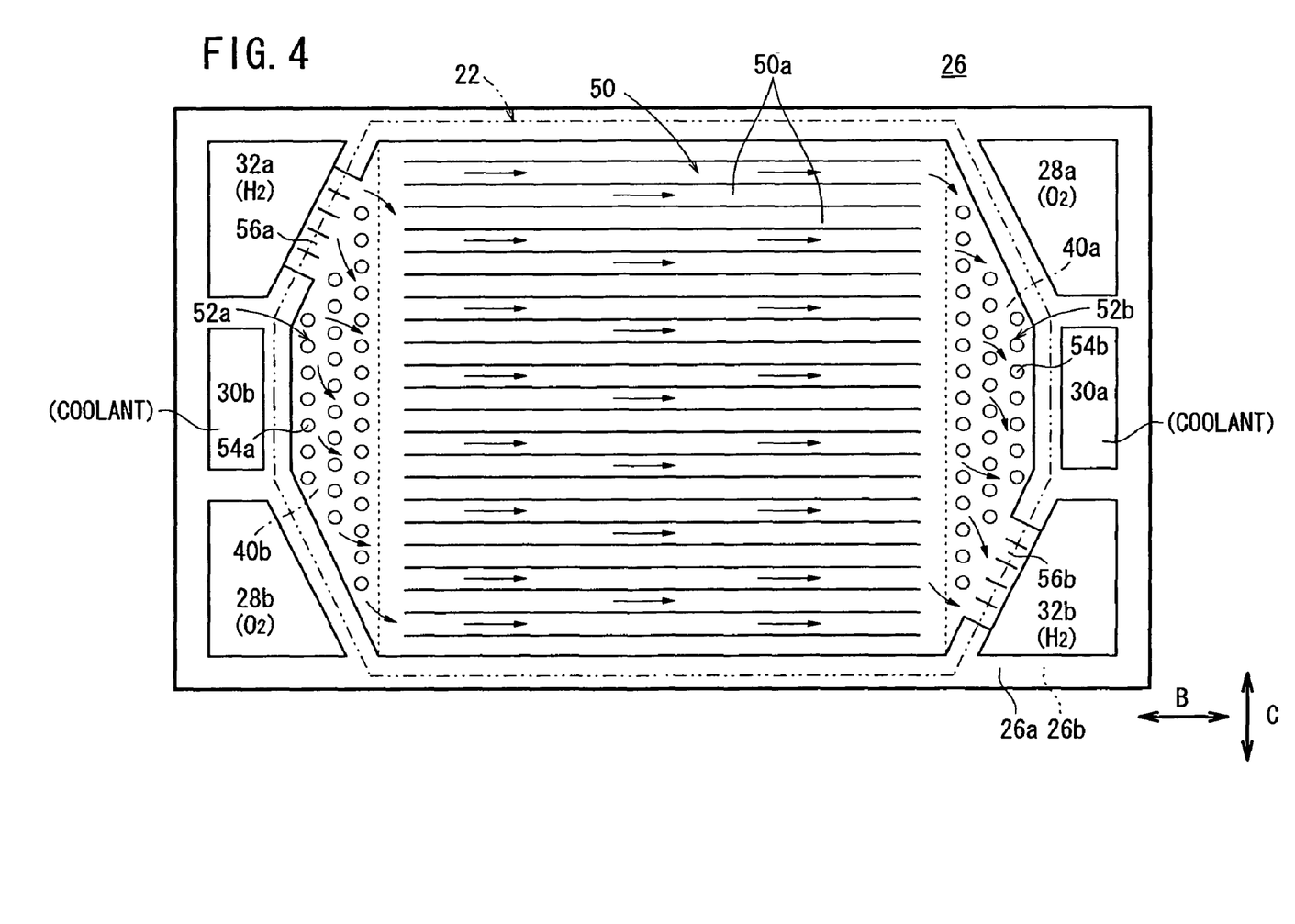
FIG. 4 is a front view showing a second separator of the power generation cell.

The second separator 26 has a fuel gas flow field 50 on a surface 26a thereof facing the membrane electrode assembly 22. As shown in FIG. 4, the fuel gas flow field 50 comprises a plurality of fuel gas flow grooves 50a extending in the direction indicated by the arrow B. A substantially triangular inlet buffer area 52a is provided at one end between the fuel gas supply passage 32a and the fuel gas flow grooves 50a, and a substantially triangular outlet buffer area 52b is provided at the other end between the fuel gas discharge passage 32b and the fuel gas flow grooves 50a.

A plurality of columnar resistance members 54a, 54b are provided respectively in the inlet buffer area 52a and the outlet buffer area 52b, which act to provide resistance to the flow of fuel gas. The fuel gas supply passage 32a is connected to the inlet buffer area 52a through connection grooves 56a, whereas the fuel gas discharge passage 32b is connected to the outlet buffer area 52b through connection grooves 56b.

As shown in FIG. 2, a coolant flow field 58 is formed on a surface 26b of the second separator 26. The coolant flow field 58 comprises a plurality of coolant flow grooves 58a extending in the direction indicated by the arrow B. The coolant flow field 58 is connected both to the coolant supply passage 30a and to the coolant discharge passage 30b. If necessary, an inlet buffer area 59a may be provided between the coolant supply passage 30a and the coolant flow grooves 58a, and an outlet buffer area 59b may be provided between the coolant discharge passage 30b and the coolant flow grooves 58a.

Though not shown, seal members (e.g., gaskets) may be provided between the surface 24a of the first separator 24 and the membrane electrode assembly 22, between the second separator 26 and the membrane electrode assembly 22, and between the surface 24b of the first separator 24 and the surface 26b of the second separator 26.

Next, functions and operations of the fuel cell stack 10 shall be described.

Firstly, as shown in FIG. 1, an oxygen-containing gas is supplied to the oxygen-containing gas supply passage 28a of the end plate 20a, and a fuel gas is supplied to the fuel gas supply passage 32a of the end plate 20a. Further, a coolant is supplied to the coolant supply passage 30a of the end plate 20a.

In the fuel cell stack 10, as shown in FIG. 2, in each of the power generation cells 12, oxygen-containing gas is supplied from the oxygen-containing gas supply passage 28a to the inlet buffer area 44a through the connection grooves 48a of the first separator 24. Columnar resistance members 46a are provided within the inlet buffer area 44a. The oxygen-containing gas is stirred by the columnar resistance members 46a, which provide a resistance to the flow of oxygen-containing gas that is supplied into the inlet buffer area 44a.

The stirred oxygen-containing gas is distributed equally to the respective oxygen-containing gas flow grooves 42a of the oxygen-containing gas flow field 42. In this structure, oxygen-containing gas flows through the oxygen-containing gas flow grooves 42a in the direction indicated by the arrow B, and is supplied to the cathode 38 of the membrane electrode assembly 22.

As shown in FIGS. 2 and 4, in each of the power generation cells 12, fuel gas is supplied from the fuel gas supply passage 32a to the inlet buffer area 52a through the connection grooves 56a of the second separator 26. Columnar resistance members 54a are provided within the inlet buffer area 52a. The fuel gas merges and branches around the columnar resistance members 54a within the inlet buffer area 52a, whereby the fuel gas is stirred.

In this structure, fuel gas is distributed equally to the respective fuel gas flow grooves 50a of the fuel gas flow field 50. The fuel gas flows in the direction indicated by the arrow B along the fuel gas flow grooves 50a, and is supplied to the anode 36 of the membrane electrode assembly 22.

Thus, in each of the membrane electrode assemblies 22, the oxygen-containing gas supplied to the cathode 38, and the fuel gas supplied to the anode 36, are consumed in electrochemical reactions at the electrode catalyst layers 38b, 36b of the cathode 38 and anode 36, thereby generating electricity (see FIG. 3).

After the oxygen-containing gas has been consumed at the cathode 38, as shown in FIG. 2, the oxygen-containing gas flows into the outlet buffer area 44b. The oxygen-containing gas is stirred by the columnar resistance members 46b, and then the oxygen-containing gas is discharged into the oxygen-containing gas discharge passage 28b through the connection grooves 48b. Likewise, after the fuel gas has been consumed at the anode 36, the fuel gas flows into the outlet buffer area 52b. The fuel gas is stirred by the columnar resistance members 54b, and then the fuel gas is discharged into the fuel gas discharge passage 32b through the connection grooves 56b (see FIG. 4).

In the first embodiment, as shown in FIG. 2, the inlet buffer area 44a and the outlet buffer area 44b are provided on the surface 24a of the first separator 24 for stirring the oxygen-containing gas, at positions located between the oxygen-containing gas flow field 42 and the oxygen-containing gas supply passage 28a, as well as between the oxygen-containing gas flow field 42 and the oxygen-containing gas discharge passage 28b, respectively. Likewise, as shown in FIG. 4, the inlet buffer area 52a and the outlet buffer area 52b are provided on the surface 26a of the second separator 26 for stirring the fuel gas, at positions located between the fuel gas flow field 50 and the fuel gas supply passage 32a, as well as between the fuel gas flow field 50 and the fuel gas discharge passage 32b, respectively.

The membrane electrode assembly 22 is sandwiched between the first and second separators 24, 26, so as to provide the first humidification section 40a stacked on the inlet buffer area 44a and the outlet buffer area 52b, and the second humidification section 40b stacked on the outlet buffer area 44b and the inlet buffer area 52a.

Figure 5:
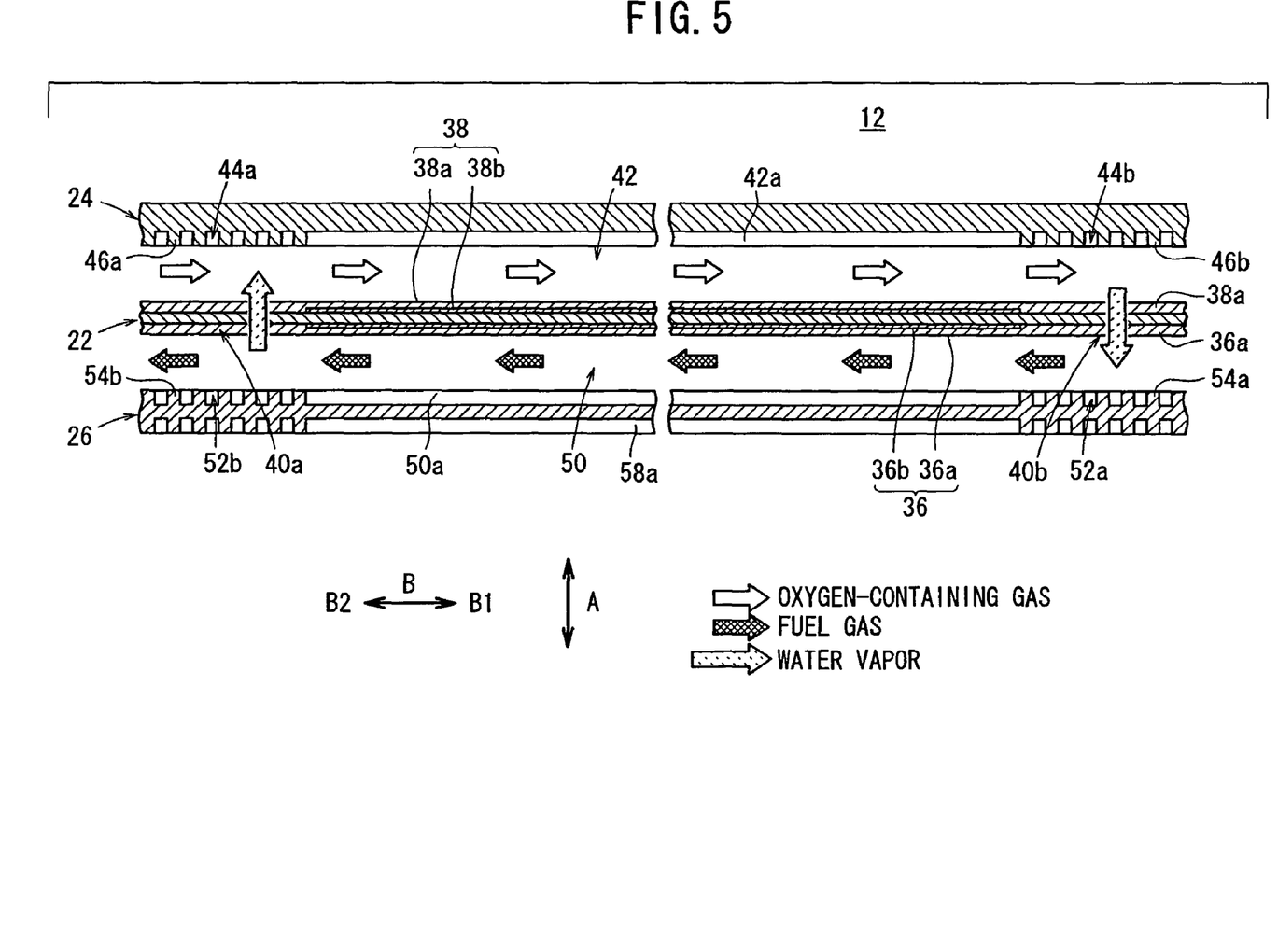
FIG. 5 is a view showing the water vapor permeation state of the power generation cell.

As shown in FIG. 5, the oxygen-containing gas flows from the inlet buffer area 44a in the direction indicated by the arrow B1 along the oxygen-containing gas flow field 42. The oxygen-containing gas, containing water therein produced during the power generation reaction, flows from the oxygen-containing gas flow field 42 to the outlet buffer area 44b. In the area of the outlet buffer area 44b, the humidified oxygen-containing gas is stirred by the columnar resistance members 46b. Thus, the flow rate of the oxygen-containing gas flowing along the outer surface of the second humidification section 40b of the membrane electrode assembly 22 increases, and turbulence occurs within the oxygen-containing gas flow.

In the second separator 26, before the fuel gas is consumed in the reaction, the fuel gas flows into the inlet buffer area 52a, and is stirred therein by the columnar resistance members 54a. Thus, the flow rate of the fuel gas, which has a relatively low humidity prior to reaction, increases before the fuel gas flows along the outer surface of the second humidification section 40b, and turbulence occurs within the fuel gas flow.

In the structure, there is a large difference in the water vapor concentration, between both outer surfaces of the second humidification section 40b. Water moves suitably from the oxygen-containing gas to the fuel gas, whereby a significant improvement is achieved in water vapor permeability. Thus, the fuel gas is humidified prior to consumption through the second humidification section 40b, and then, the fuel gas is supplied to the anode 36. Accordingly, it is possible to reliably prevent drying of the membrane electrode assembly 22. Further, by improving water vapor permeability, the surface area of the second humidification section 40b can be reduced advantageously, while maintaining a satisfactory water vapor permeation amount. As a result, the size of the second humidification section 40b can easily be reduced.

Further, since the gas flow distribution is non-uniform in the outlet buffer area 44b and inlet buffer area 52a, water produced during the power generation reaction can be retained easily within the outlet buffer area 44b and the inlet buffer area 52a. Since the outlet buffer area 44b and the inlet buffer area 52a cannot suitably be used for power generation, therefore, the outlet buffer area 44b and the inlet buffer area 52a are used as humidification areas, without otherwise reducing the power generation areas in the oxygen-containing gas flow field 42 and the fuel gas flow field 50. Thus, the size of the power generation cell 12 can be reduced, while the overall size and weight of the fuel cell stack 10 can advantageously be reduced as well.

Further, after the fuel gas has flowed along the fuel gas flow field 50 in the direction indicated by the arrow B2, the fuel gas, containing water therein, flows into the outlet buffer area 52b. The outlet buffer area 52b overlaps with the inlet buffer area 44a, such that the first humidification section 40a is interposed between the outlet buffer area 52b and the inlet buffer area 44a.

In this structure, the consumed fuel gas, which contains an abundance of water, and the oxygen-containing gas, which has a relatively low humidity prior to consumption, contact both outer surfaces of the first humidification section 40a. The water contained within the fuel gas flows through the first humidification section 40a, and is supplied to the oxygen-containing gas prior to consumption. Thus, the oxygen-containing gas prior to consumption is suitably humidified, and then is supplied to the oxygen-containing gas flow field 42. Accordingly, it is possible to prevent drying of the membrane electrode assembly 22.

Further, the columnar resistance members 46a, 54a, 46b, 54b are provided within the inlet buffer areas 44a, 52a and the outlet buffer areas 44b, 52b, respectively. In this structure, pressures of the oxygen-containing gas and the fuel gas are reduced uniformly, without any directivity, whereby the flow rates inside the oxygen-containing gas flow grooves 42a and the fuel gas flow grooves 50a become uniform.

The power generation section and the first and second humidification sections 40a, 40b are formed integrally on both surfaces of the solid polymer electrolyte membrane 34. The power generation section includes the electrode catalyst layers 36b, 38b and the gas diffusion layers 36a, 38a. The first and second humidification sections 40a, 40b include only the gas diffusion layers 36a, 38a, but do not include the electrode catalyst layers 36b, 38b. Thus, the sealing structure for sealing the membrane electrode assembly 22 is simplified, and the cost for fabricating the membrane electrode assembly 22 can advantageously be reduced.

As shown in FIG. 2, a coolant such as pure water or ethylene glycol is supplied to the coolant flow field 58 between the first and second separators 24, 26. The coolant flows in the direction indicated by the arrow B along the coolant flow grooves 58a. After the coolant has been used for cooling the membrane electrode assembly 22, the coolant is discharged into the coolant discharge passage 30b, and is circulated again for use in the system.

Figure 6:
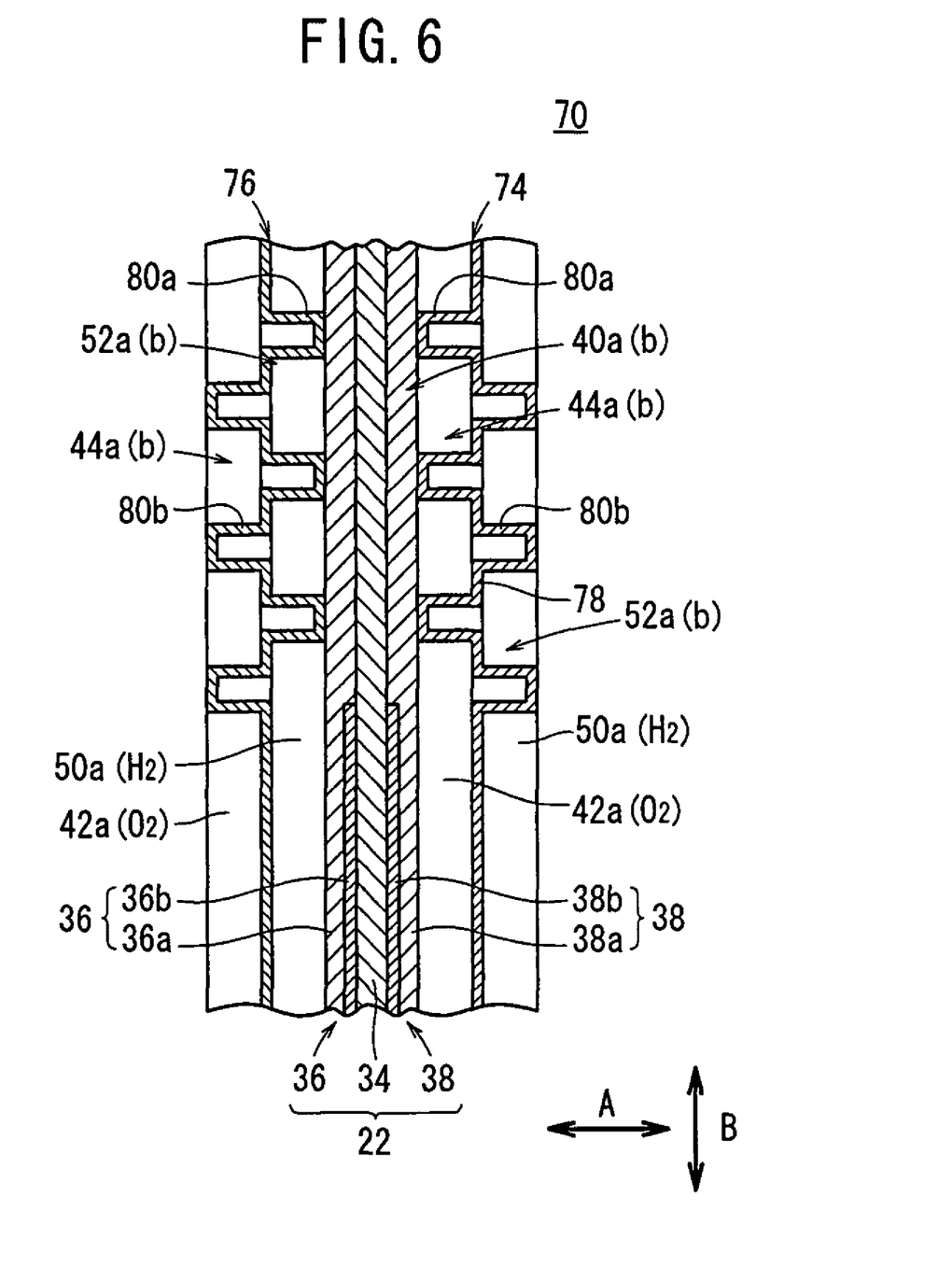
FIG. 6 is a partial enlarged cross sectional view showing a power generation cell of a fuel cell stack according to a second embodiment of the present invention.

FIG. 6 is a partial exploded cross sectional view showing a power generation cell 70 of a fuel cell stack according to a second embodiment of the present invention. Constituent elements that are identical to those of the fuel cell stack 10 according to the first embodiment have been labeled using the same reference numerals, and hence, detailed descriptions of such elements shall be omitted. Further, in the third and fourth embodiments to be described later, constituent elements that are identical to those of the fuel cell stack 10 according to the first embodiment have been labeled using the same reference numerals, and detailed descriptions of such elements shall be omitted.

The power generation cell 70 includes a membrane electrode assembly 22, and first and second separators 74, 76 sandwiching the membrane electrode assembly 22 therebetween. The first and second separators 74, 76 are constructed from thin metal plates. Inlet buffer areas 44a, 52a and outlet buffer areas 44b, 52b are formed on each of the first and second separators 74, 76.

Specifically, the first separator 74 has a neutral surface 78, wherein a plurality of first cylindrical protrusions 80a and a plurality of second cylindrical protrusions 80b are provided alternately on the surface 78, at positions facing the first and second humidification sections 40a, 40b. The first cylindrical protrusions 80a protrude toward the membrane electrode assembly 22 on one side thereof in the stacking direction, whereas the second cylindrical protrusions 80b protrude toward the membrane electrode assembly 22 on the other side thereof in the stacking direction.

The inlet buffer area 44a and the outlet buffer area 44b are formed between the first cylindrical protrusions 80a and the first and second humidification sections 40a, 40b, near the cathode 38 on the one side of the membrane electrode assembly 22. The inlet buffer area 44a and the outlet buffer area 44b are connected to a plurality of oxygen-containing gas flow grooves 42a, which are formed on the first separator 74.

An inlet buffer area 52a and an outlet buffer area 52b are formed between the second cylindrical protrusions 80b and the first and second humidification sections 40a, 40b near the anode 36 on the other side of the membrane electrode assembly 22. The inlet buffer area 52a and the outlet buffer area 52b are connected to a plurality of fuel gas flow grooves 50a, which are formed on the first separator 74.

The second separator 76 has a structure that is identical to that of the first separator 74. The constituent elements of the second separator 76 that are identical to those of the first separator 74 have been labeled using the same reference numerals, and descriptions thereof shall be omitted. A plate having coolant flow field grooves (not shown) disposed therein at predetermined intervals may be provided, as necessary, between the power generation cells 70.

In the second embodiment, the first and second separators 74, 76 can be formed by metal plates. The first and second cylindrical protrusions 80a, 80b can be fabricated by pressure forming. Thus, the structure of the first and second separators 74, 76 is simplified significantly, and overall production costs for the fuel cell stack are reduced.

Figure 7:
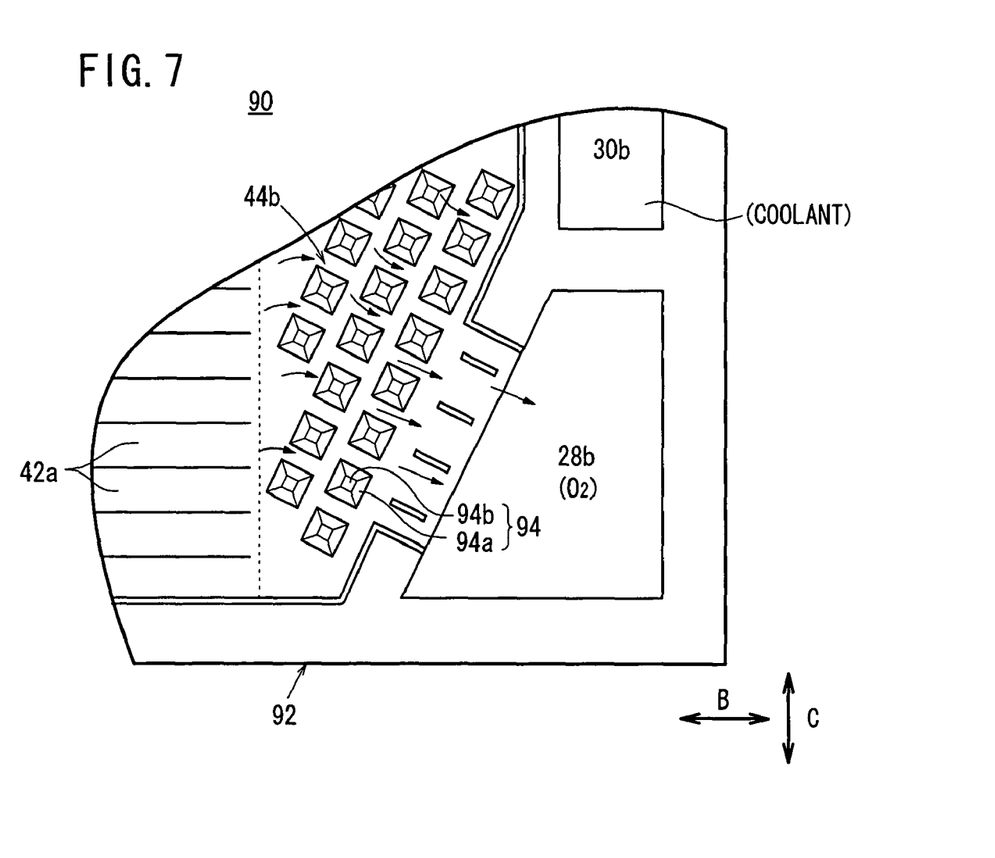
FIG. 7 is a partial enlarged view showing a first separator of a power generation cell of a fuel cell stack according to a third embodiment.
Figure 8:
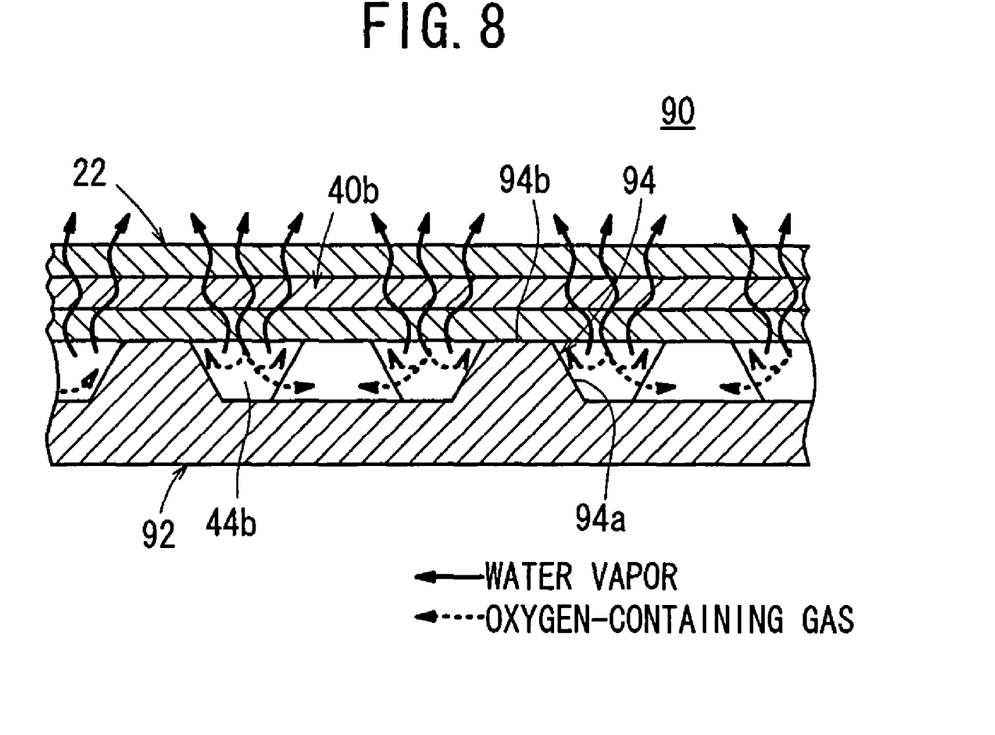
FIG. 8 is a partial cross sectional view illustrating the power generation cell of FIG. 7.

FIG. 7 is a partial enlarged view showing a first separator 92 of a power generation cell 90 of a fuel cell stack according to the third embodiment of the present invention. FIG. 8 is a partial cross sectional view showing the power generation cell 90 of FIG. 7.

The first separator 92 is a carbon plate. A plurality of pyramid shaped resistance members 94 are formed within an outlet buffer area 44b of the first separator 92, providing resistance to the flow of the oxygen-containing gas. Each of the pyramid shaped resistance members 94 has an inclined surface 94a, which is tapered (narrowed) toward the membrane electrode assembly 22. A top surface 94b of the pyramid shaped resistance member 94, having the smallest cross sectional area, contacts the second humidification section 40b.

Though not shown, the inlet buffer area 44a of the first separator 92 and the outlet buffer area 44b of the first separator 92 have the same structure. Further, the second separator (not shown) has the same structure as the first separator 92. Moreover, in the fourth embodiment as well, to be described later, both the inlet buffer area and the outlet buffer area have substantially the same structure.

In the third embodiment, as shown in FIG. 8, the narrow top surfaces 94b of each of the pyramid shaped resistance members 94 contact the second humidification section 40b, wherein the surface area of the second humidification section 40b that contacts the oxygen-containing gas is suitably increased. Further, the oxygen-containing gas is stirred efficiently by the inclined surfaces 94a of the pyramid shaped resistance members 94. Hence, in this structure, the flow rate of the oxygen-containing gas that flows along the surface of the second humidification section 40b is increased, and further, the contact area between the oxygen-containing gas and the second humidification section 40b is increased. Thus, a further improvement in water vapor permeability within the second humidification section 40b can be achieved.

Figure 9:
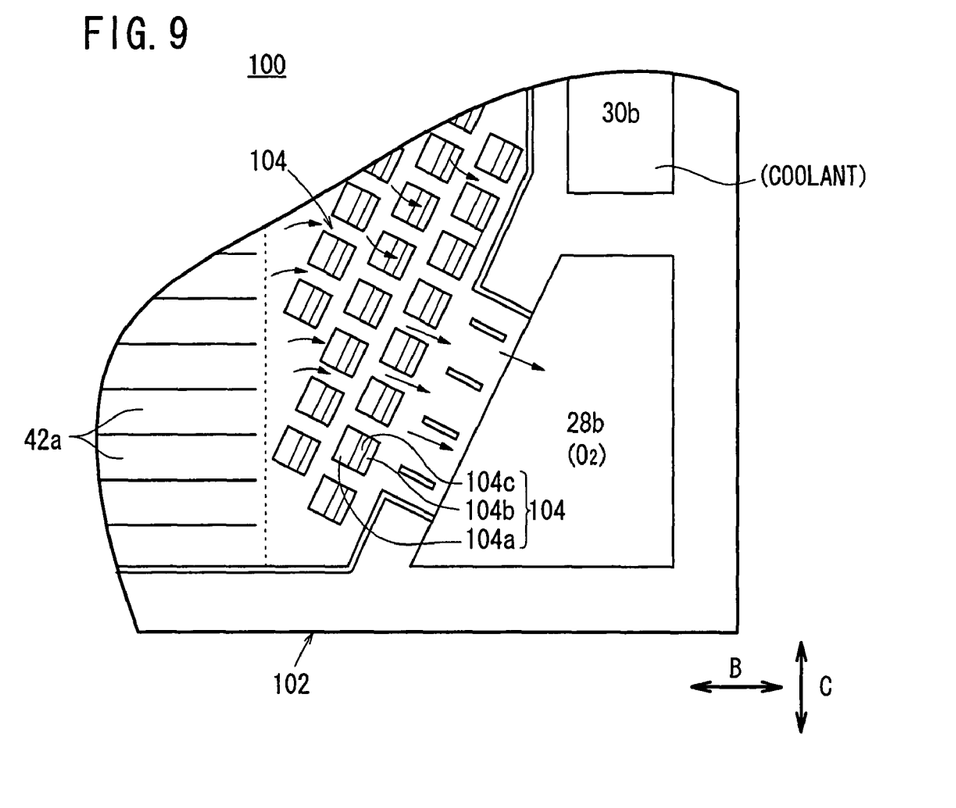
FIG. 9 is a partial enlarged view showing a power generation cell of a fuel cell stack according to a fourth embodiment of the present invention.
Figure 10:
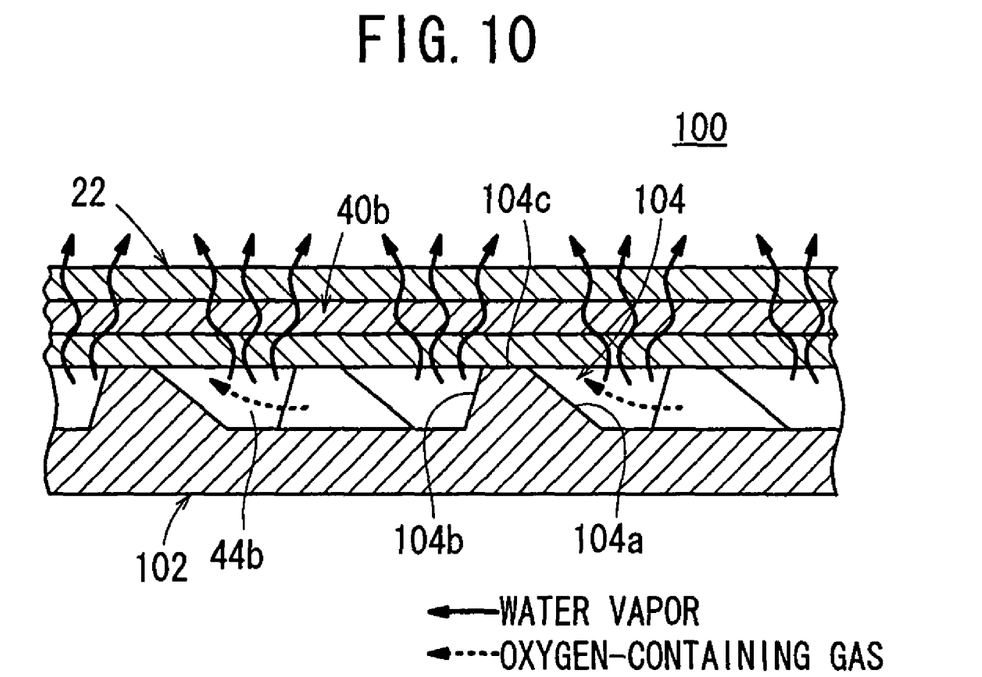
FIG. 10 is a partial cross sectional view illustrating the power generation cell of FIG. 9.

FIG. 9 is a partial enlarged view showing a first separator 102 of a power generation cell 100 according to the fourth embodiment of the present invention. FIG. 10 is a partial cross sectional view showing the power generation cell 100 of FIG. 9.

A plurality of prismatic resistance members 104 are formed within an outlet buffer area 44b of the first separator 102, which provide resistance to the flow of oxygen-containing gas. Each of the prismatic resistance members 104 has a first inclined surface 104a oriented along a flow direction of the oxygen-containing gas, and a second inclined surface 104b disposed oppositely to the first inclined surface 104a. The first inclined surface 104a is inclined gently from the bottom surface side thereof to the second humidification section 40b, whereas the second inclined surface 104b is inclined steeply from a top surface 104c, which contacts the second humidification section 40b, to the bottom surface side thereof.

In the fourth embodiment, after the oxygen-containing gas flows into the outlet buffer area 44b, the oxygen-containing gas is stirred by the prismatic resistance members 104. Under guidance of the first inclined surface 104a, the oxygen-containing gas moves into the second humidification section 40b. Accordingly, water vapor in the oxygen-containing gas reliably and smoothly permeates into the second humidification section 40b, wherein a further improvement in water vapor permeability is achieved.

While the invention has been particularly shown and described with reference to preferred embodiments, it should be understood that variations and modifications can be made to the invention by persons skilled in the art without departing from the spirit and scope of the invention as defined by the appended claims.

What is claimed is:

1. A fuel cell formed by stacking a membrane electrode assembly and first and second separators sandwiching the membrane electrode assembly, said membrane electrode assembly including a pair of electrodes and an electrolyte membrane interposed between said electrodes, a reactant gas passage for passing a reactant gas therethrough and extending through said separator in the stacking direction, said first and second separators each comprising:

a reactant gas flow field formed at a position corresponding to a power generation area of said electrode for supplying the reactant gas to said electrode, wherein the reactant gas flow field comprises a fuel gas field formed on the first separator to supply a fuel gas to one of the electrodes, and an oxygen-containing gas flow field formed on the second separator to supply an oxygen-containing gas to the other electrode; and a buffer area provided between said reactant gas flow field and said reactant gas passage for stirring the reactant gas, said membrane electrode assembly comprising a humidification section facing said buffer area, wherein water permeates through said humidification section from said buffer area, the buffer area of said first separator and the buffer area of said second separator facing each other through said membrane electrode assembly, the water in the fuel gas permeating from the fuel gas flow field to the oxygen-containing gas flow field through a first humidification section, the water in the oxygen-containing gas permeating from the oxygen-containing gas flow field to the fuel gas flow field through a second humidification section, the fuel gas and the oxygen-containing gas flowing in a counterflowing manner.

2. A fuel cell according to claim 1, wherein a resistance member is provided in said buffer area for providing resistance to the flow of said reactant gas.

3. A fuel cell according to claim 2, wherein said resistance member comprises a plurality of columnar resistance members.

4. A fuel cell according to claim 2, wherein said resistance member comprises a plurality of cylindrical protrusions.

5. A fuel cell according to claim 2, wherein said resistance member includes an inclined guide for guiding the reactant gas toward said membrane electrode assembly.

6. A fuel cell according to claim 5, wherein said resistance member comprises a plurality of pyramid shaped resistance members, and wherein each of said pyramid shaped resistance members includes an inclined surface, which is tapered toward said membrane electrode assembly, acting as said inclined guide.

7. A fuel cell according to claim 5, wherein said resistance member comprises a plurality of prismatic resistance members, and wherein each of said prismatic resistance members comprises a first inclined surface oriented along a flow direction of said reactant gas and acting as said inclined guide, and a second steeply inclined surface, positioned on an opposite side of said first inclined surface.

8. A fuel cell according to claim 1, wherein said electrode comprises an electrode catalyst layer and a gas diffusion layer, and wherein said humidification section comprises said gas diffusion layers only.

* * * * *